Oct. 6, 1970 T. F. HRYNIK 3,532,361
VEHICLE SHOULDER HARNESS STOWAGE MEANS
Filed Aug. 15, 1968
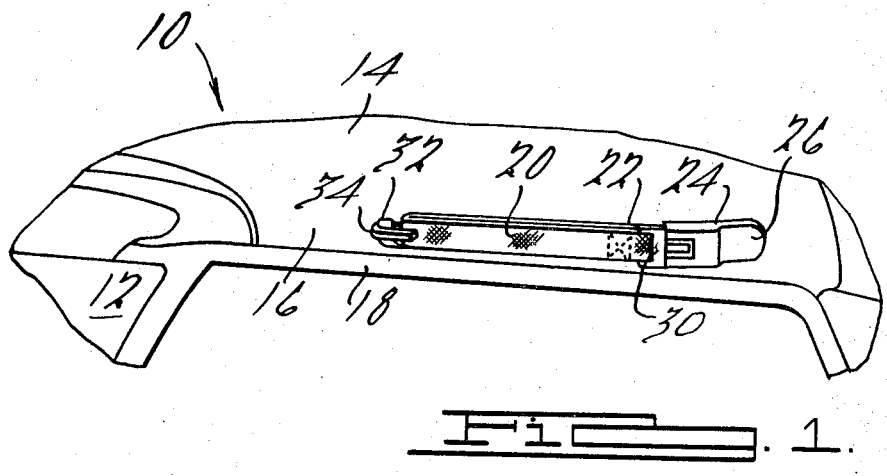
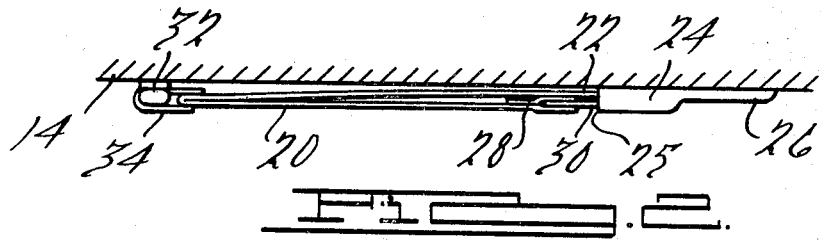
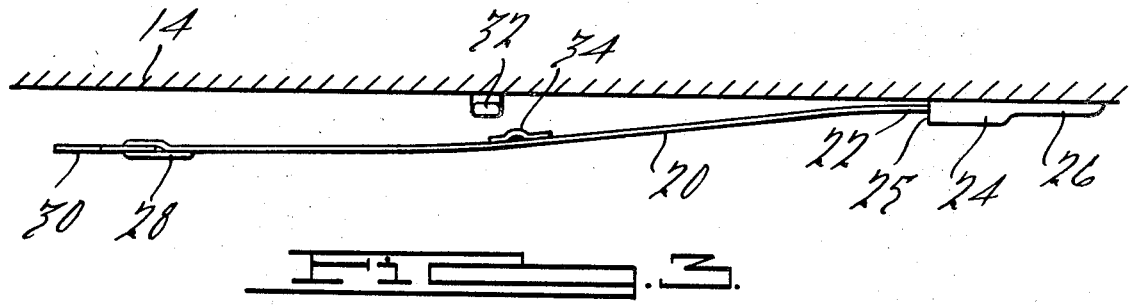
INVENTOR.
Thomas F. Hrynik.
BY John R. Faulkner
E. Dennis O'Connor
ATTORNEYS United States Patent Office 3,532,361
Patented Oct. 6, 1970

3,532,361
VEHICLE SHOULDER HARNESS STOWAGE MEANS
Thomas F. Hrynik, Warren, Mich., assignor to Ford Motor Company, Dearborn, Mich., a corporation of Delaware
Filed Aug. 15, 1968, Ser. No. 752,900
Int. Cl. B60r *21/00;* A62b *35/00*
U.S. Cl. 280—150                     9 Claims

ABSTRACT OF THE DISCLOSURE

Means for the stowage of the outboard belt segment of a vehicle passenger shoulder harness in a horizontal position along the roof rail of the vehicle. A projection similar to a vehicle coat hook extends from the roof rail such that an elastomeric loop secured to the belt segment at the midpoint of the latter may be stretched resiliently and engaged by the projection. The free end of the belt segment then may be positioned releasably by its insertion in a conventional rubber boot proximate the belt segment anchoring point on the roof rail. Sagging of the belt is prevented by a tensioning force applied thereto by the stretched loop.

BACKGROUND OF THE INVENTION

The use of shoulder harness passenger restraint devices in motor vehicle interiors makes desirable the provision of means for stowing the outboard belt segments of such devices when they are not in use in an unobtrusive yet easily accessible position. The anchoring points of these belt segments conventionally are located above the vehicle door openings in the roof rail area of the body roof panel. If the outboard belt segments are not stowed when not in use, this arrangement allows these belt segments to hang down into the door opening to impede access and egress to and from the vehicle passenger compartment. Also, loose belt segments hanging from a roof panel contribute to a cluttered and unattractive passenger compartment appearance.

Shoulder harness belt segment stowage devices now in use allow the outboard belt segment to be folded back against itself around some type of wire projection that extends upwardly from the vehicle window header forward of the belt segment anchoring point. The free end of the belt segment detachably is secured in a rubber boot proximate the anchoring point of the belt segment so that the belt segment lies in a substantially horizontal position along the roof rail above the window header.

Several undesirable circumstances are possible with such an arrangement. Repeated positioning of the belt segment around the wire projection may cause a deformation of this projection such that a stowed belt will have slack therein and hang down into the door opening. This same consequence is possible if the fit between the free end of the belt segment (that carries a belt buckle tongue) and the rubber boot becomes loose due to repeated use. Also, the manual task of folding the belt segment about the wire projection is cumbersome and requires significant dexterity.

The object of this invention is to provide shoulder harness stowage means that minimize or eliminate the disadvantages described above. These stowage means allow the outboard belt segments of a shoulder harness to be stowed conveniently with the performance of a simple manual task when use of the harness is not desired. Also, it is provided that the stowed segment, lying in a stowed position along the roof rail above the window header, will not sag into the vehicle door opening despite repeated use of the parts involved.

SUMMARY OF THE INVENTION

Shoulder harness belt segment stowage means constructed in accordance with this invention are adapted for utilization in a motor vehicle having body structure defining the roof of a passenger compartment and a shoulder harness belt segment having one end thereof secured to the body structure at an anchoring point within the passenger compartment. The belt segment stowage means include a projection extending from the body structure and spaced from the anchoring point a distance greater than one half the length of the belt segment. An elastomeric loop is secured to the belt segment substantially midway along the length of this segment and is adapted to be engaged by the projection. When engaged by the projection, the elastomeric loop is resiliently stretched such that the stowed belt, folded back against itself in a conventional manner, is placed in tension that prevents sagging of the belt into the passenger door opening.

BRIEF DESCRIPTION OF THE DRAWING

FIG. 1 is a side elevation view of a portion of vehicle body structure defining a passenger compartment of the vehicle and illustrating the vehicle harness stowage means of this invention;

FIG. 2 is a top sectional view of a portion of the body structure of FIG. 1 illustrating the outboard segment of the shoulder harness in the stowed position; and FIG. 3 is a view similar to FIG. 2, but illustrating the vehicle outboard shoulder harness segment in an extended position as when ready for use.

DETAILED DESCRIPTION OF THE INVENTION

Referring now in detail to the drawings, the numeral 10 denotes vehicle body structure partially defining a passenger compartment. This body structure includes a windshield 12 and a roof panel 14 having a roof rail area 16 located proximate to and above a window header 18.

A belt segment 20 comprising the outboard segment of a passenger restraining shoulder harness has one end 22 thereof extending into a conventional belt segment boot 24 through an opening 25 formed in the boot. Within boot 24, end 22 of belt segment 20 is secured to panel 14 by conventional fastening means, not illustrated, at anchoring point 26. The end 28 of belt segment 20 that is remote from end 22 carries disconnect component means comprising a belt buckle tongue 30.

A hook-shaped projection 32 is secured to panel 14 forward of anchoring point 26. This projection may be a conventional plastic or hard rubber vehicle coat hook. The distance between projection 32 and anchoring point 27 is greater than one-half the length the belt segment 20. The importance of this relationship will be explained in detail below.

A loop 34 of elastic material is secured to belt segment 20 at substantially the midpoint of this belt segment. Loop 34 is formed from a length of elastic fabric having each of its ends stitched or otherwise secured to the fabric of belt segment 20.

FIG. 3 illustrates the orientation of belt segment 20 when utilization of this belt segment is desired. Tongue 30 is adapted to cooperate with a belt buckle carried on the end of an inboard belt segment that is anchored to the flor of the passenger compartment. With tongue 30 suitably engaged with this belt buckle, belt segment 20 cooperates with the inboard belt segment to form a shoulder harness for restraint of the vehicle passenger.

When stowage of belt segment 20 is desired, tongue 30 is disconnected from the cooperating belt buckle and belt segment 20 is folded back against itself such that tongue 30 is inserted in opening 25 of boot 24. Frictional engagement between tongue 30 and the side walls of opening 25 hold tongue 30 within boot 24.

This folding of belt segment 20 provides that loop 34, positioned midway along the length of the belt extends from the most forward belt segment portion, that is, the belt segment portion proximate to projection 32.

Since the distance between projection 32 and anchoring point 26 exceeds one half the length of belt segment 20, projection 32 will be spaced from elastic loop 34 when belt segment 20 is in the orientation illustrated in FIG. 2. Elastic loop 34 is capable of being resiliently extended or stretched such that it manually may be placed about the upwardly extending portion of projection 32. With projection 32 engaging loop 34, the latter is placed in tension and exerts a force longitudinally along the folded over length of belt segment 20 such that a tensioning force is placed along the belt segment.

From the foregoing description, it readily may be appreciated that the stowage means provided by this invention require little manual dexterity in order that belt segment 20 conveniently may be stowed along roof rail portion 16 of roof panel 14. It is not difficult for a vehicle occupant to slide belt buckle tongue 30 into opening 25 of boot 24 and subsequently position elastic loop 34 about projection 32. These manual tasks may be performed, of course, in reverse order. That is, loop 34 may be placed about projection 32 prior to the insertion of belt buckle tongue 30 in boot 24. Since projection 32 is constructed and arranged similar to a conventional vehicle coat hook, this projection will not be deformed due to repeated use as an element in the belt segment stowage means as described. Furthermore, if the friction fit between tongue 30 and boot 24 becomes loose due to repeated use such that the frictional force of this engagement is not sufficient to hold tongue 30 completely within opening 25, the tensioning force exerted along the length of folded over belt segment 20 by stretched elastomeric loop 34 will hold belt segment 20 in a substantially horizontal position and will prevent the belt segment from sagging into the vehicle door opening located beneath window header 18.

It thus may be seen that this invention provides means for conveniently stowing the outboard belt segment of a vehicle shoulder harness such that this belt segment is readily available when use of the shoulder harness is desired. The elements of this invention also cooperate to provide for unobstructive stowing of this belt segment despite continual usage and wear on the parts involved.

I claim:
1. Shoulder harness belt segment stowage means adapted for utilization in a motor vehicle having body structure defining the roof of a passenger compartment and a shoulder harness belt segment having one end thereof secured to said body structure at a anchoring point within said passenger compartment, said belt segment stowage means including: a projection extending from said body structure and spaced from said anchoring point a distance greater than one half the length of said belt segment, and projection engaging means secured to said belt segment substantially midway along the length of said belt segment and having a width substantially less than the width of said belt segment, said engaging means capable of being manually looped about said projection.

2. The shoulder harness belt segment stowage means of claim 1, wherein said projection engaging means comprises a loop of elastomeric material, said material being resiliently stretched when positioned about said projection.

3. The shoulder harness belt segment stowage means of either claim 1 or 2, wherein the other end of said belt segment has disconnect component means secured thereto, and locating means operatively secured to said body structure proximate said mounting point and capable of releasably securing said disconnect component means in a position adjacent said mounting point.

4. In a motor vehicle having body structure defining the roof of a passenger compartment with a portion of said body structure comprising a roof rail, a shoulder harness belt segment adapted to be stored when not in use in a substantially horizontal position along said roof rail, one end of said belt segment secured to said roof rail at a mounting point, a projection extending from said roof rail at a position spaced from said mounting point a distance exceeding one half the length of said belt segment, and an elastomeric loop secured to said belt segment at substantially the midpoint of said belt segment and adapted to be placed in tension and engaged by said projection.

5. In a motor vehicle according to claim 4, wherein said projection is located on said vehicle forward of said mounting point.

6. In a motor vehicle according to claim 4, wherein said projection is hook-shaped.

7. In a motor vehicle according to claim 4, wherein the other end of said belt segment has secured thereto first disconnect component means adapted to cooperate with second disconnect component means secured to a second belt segment.

8. In a motor vehicle according to claim 7, including releasable fastening means operatively secured to said roof rail proximate said mounting point and capable of releasably securing said first disconnect component means against movement.

9. In a motor vehicle according to claim 8, wherein said releasable fastening means comprises a rubber boot having an opening therein, said first disconnect component means receivable in said opening.

References Cited

UNITED STATES PATENTS 3,401,980   9/1968   Nicholas _____ 297—389

FOREIGN PATENTS 1,498,914   9/1967   France.

BENJAMIN HERSH, Primary Examiner

L. J. PAPERNER, Assistant Examiner

U.S. Cl. X.R.

297—389